(12) United States Patent
Jeong et al.

(10) Patent No.: US 9,021,171 B2
(45) Date of Patent: *Apr. 28, 2015

(54) BUS SYSTEM INCLUDING A MASTER DEVICE, A SLAVE DEVICE, AN INTERCONNECTOR COUPLED BETWEEN THE MASTER DEVICE AND THE SLAVE DEVICE, AND AN OPERATING METHOD THEREOF

(71) Applicant: Samsung Electronics Co., Ltd., Suwon-si, Gyeonggi-do (KR)

(72) Inventors: Bub-chul Jeong, Yongin-si (KR); Jaegeun Yun, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/170,086

(22) Filed: Jan. 31, 2014

(65) Prior Publication Data

US 2014/0149619 A1    May 29, 2014

Related U.S. Application Data

(63) Continuation of application No. 13/244,493, filed on Sep. 25, 2011, now Pat. No. 8,667,195.

(51) Int. Cl.
*G06F 13/00* (2006.01)
*G06F 13/364* (2006.01)
*G06F 13/362* (2006.01)
*G06F 13/14* (2006.01)

(52) U.S. Cl.
CPC .............. *G06F 13/362* (2013.01); *G06F 13/14* (2013.01); *G06F 13/364* (2013.01)

(58) Field of Classification Search
CPC  G06F 13/364; G06F 13/4027; G06F 13/4022
USPC ......................................... 710/110, 305–317
See application file for complete search history.

(56) References Cited

U.S. PATENT DOCUMENTS

| | | | |
|---|---|---|---|
| 5,854,906 A | 12/1998 | Van Loo | |
| 6,442,641 B1 | 8/2002 | Bury et al. | |
| 7,535,297 B2 | 5/2009 | Chen et al. | |
| 7,757,027 B2 | 7/2010 | Laycock et al. | |
| 7,822,903 B2 | 10/2010 | Hofmann et al. | |
| 8,285,903 B2 | 10/2012 | Meredith | |
| 8,667,195 B2 * | 3/2014 | Jeong et al. ................. | 710/110 |
| 2004/0236893 A1 | 11/2004 | May et al. | |
| 2005/0273536 A1 | 12/2005 | Mathewson et al. | |

(Continued)

FOREIGN PATENT DOCUMENTS

| | | |
|---|---|---|
| JP | 2008-40894 A | 2/2008 |
| KR | 10-2006-0103685 A | 10/2006 |
| KR | 10-2008-0062979 A | 7/2008 |

*Primary Examiner* — Raymond Phan
(74) *Attorney, Agent, or Firm* — Sughrue Mion, PLLC

(57) ABSTRACT

A system-on-chip bus system and an operating method of the same are provided. The bus system includes a master device, a slave device and an interconnector coupled between the master device and the slave device. The interconnector includes a synchronization/compaction block to control traffic provided from a master device to a slave device. When a write request traffic and a corresponding write data traffic are all provided from the master device, the synchronization/compaction block may transfer the two traffics to the slave device.

20 Claims, 10 Drawing Sheets

(56) References Cited

U.S. PATENT DOCUMENTS

| | | |
|---|---|---|
| 2005/0273537 A1 | 12/2005 | Harris et al. |
| 2007/0067549 A1 | 3/2007 | Gehman |
| 2008/0301342 A1 | 12/2008 | Hofmann et al. |
| 2009/0177821 A1 | 7/2009 | Dinkjian et al. |
| 2009/0177822 A1 | 7/2009 | Adar et al. |
| 2011/0258353 A1 | 10/2011 | Wang |
| 2012/0215955 A1 | 8/2012 | Yun et al. |

* cited by examiner

BUS SYSTEM INCLUDING A MASTER DEVICE, A SLAVE DEVICE, AN INTERCONNECTOR COUPLED BETWEEN THE MASTER DEVICE AND THE SLAVE DEVICE, AND AN OPERATING METHOD THEREOF

CROSS-REFERENCE TO RELATED APPLICATIONS

This is a Continuation application of U.S. application Ser. No. 13/244,493 filed Sep. 25, 2011, which claims priority under 35 U.S.C. §119 from Korean Patent Application No. 10-2010-0102010, filed on Oct. 19, 2010, the entirety of which is incorporated herein by reference.

BACKGROUND

1. Field

Systems and methods consistent with exemplary embodiments relate to bus systems and operating methods thereof and, more particularly, to a system-on-chip bus system including an interconnector and an operating method thereof.

2. Description of Related Art

In recent years, digital electronic devices have trended toward miniaturization, high performance, multi-functionalization, and convergence. Accordingly, the use of a system on chip (SoC) where function blocks or components of a system are integrated into a single chip has been generalized. In the design of a system on chip (SoC), SoC development time is necessarily reduced to cope with rapidly changing market demands. To achieve this goal, reuse of pre-designed system blocks, i.e., intellectual property (IP) blocks is increasingly extending. The reuse of IP blocks allows product development time to be reduced and is effective in improving reliability of a newly developed SoC.

For effective design of a system on chip (SoC), it is an important to select a bus system for intercommunication between a plurality of IP blocks integrated into a single chip. In a bus system, transmission and reception of data are conducted according to a determined protocol of the bus system. The most popular bus system is an advanced microcontroller bus architecture (AMBA) provided by the Advanced RISC Machine (ARM). The AMBA includes a variety of protocols such as, for example, an advanced high-performance bus (AHB) connecting high-speed IP blocks, an advanced extensible interface (AXI), and an advanced peripheral bus (APB) connecting low-speed IP blocks.

SUMMARY

One or more exemplary embodiments provide a bus system with an interconnector coupled between a master device and a slave device and an operating method of the bus system.

According to an aspect of an exemplary embodiment, there is provided a bus system may include a master device; a slave device; and an interconnector coupled between the master device and the slave device through a plurality of buses, wherein the interconnector includes: a first interface configured to interface with the master device; a second interface configured to interface with the slave device; and a synchronization/compaction block coupled between the first interface and the second interface and configured to control transfer of a write request and write data corresponding to the write request and provided by the master, and wherein the interconnector delays transfer the write request to the slave device until the write data corresponding to the write request is provided by the master, and then transfers the write request and the write data corresponding to the write request to the slave device.

The interconnector may immediately transfers the provided write request and the provided write data when the master device does not perform a burst transfer operation.

The synchronization/compaction block may include a write request buffer configured to temporarily store the write request; a write data buffer configured to temporarily store the write data; and a control unit configured to determine whether write data corresponding to the provided write request is provided and control the write request buffer and the write data buffer according to a result of the determination.

Sizes of the write request buffer and the write data buffer may each be set according to length of burst data provided from the master device.

In certain embodiments, the write request buffer may have a larger size than the write data buffer.

The master interface may change an order to transfer the provided write data according to the priority of the write request provided from the master device.

The interconnector may further include a switching block configured to switch a transfer path to the slave device according to a request provided from the master device.

The bus system may further include a bus component coupled between the master device and the interconnector and configured to expand data width of the bus system.

The synchronization/compaction block may control transfer time to prevent delay time from occurring when the provided write request and the provided write data are transferred. If a plurality of write data are provided, the synchronization/compaction block controls transfer time to prevent delay time from occurring when the plurality of write data are transferred.

The plurality of buses include a write request bus for transferring a write request and a write data bus for transferring write data. The write request bus and the write data bus are electrically isolated from each other.

According to an aspect of another exemplary embodiment, there is provided an operating method of a bus system including a master device, a slave device, and an interconnector coupled between the master device and the slave device, the operating method including: receiving, by the interconnector, a write request from the master device; determining, by the interconnector, whether write data corresponding to the write request has been received from the master device; waiting, by the interconnector, to transfer the write request from the interconnector to the slave device if it is determined that the write data has not been received; and transferring the write request and the write data from the interconnector to the slave device if it is determined that the write data has been received.

According to an aspect of another exemplary embodiment, there is provided an operating method of a bus system comprising a master device, a slave device, and an interconnector coupled between a master device and a slave device, the operating method including: receiving, by the interconnector, a write request from the master device; receiving, by the interconnector, write data corresponding to the write request from the master device; determining, by the interconnector, a point of time when the write request and the write data are to be transferred; and transferring the write request and the write data from the interconnector to the slave device, wherein the determining the point of time includes: determining a time required until providing write data not yet provided from the master device; and determining a time required for transferring all write data corresponding the write request.

The transferring of the write request and the write data may be conducted when it is determined that the time required until providing write data not yet provided from the master device is shorter than or equal to the time required for transferring all write data corresponding the write request.

The operating method of the interconnector may further include waiting for transfer of the write request and the write data to the slave device. The waiting for transfer is conducted when it is determined that the time required until providing write data not yet provided from the master device is longer than the time required for transferring all write data corresponding the write request.

The judging of the time may be conducted with reference to information on a size of write data included in the write request.

The operating method of the interconnector may further include storing the write request; and storing the write data.

BRIEF DESCRIPTION OF THE DRAWINGS

The above and other aspects will become apparent from the following description with reference to the following figures, wherein like reference numerals refer to like parts throughout the various figures unless otherwise specified, and wherein.

DETAILED DESCRIPTION

Exemplary embodiments will be described in more detail with reference to the accompanying drawings. It should be noted, however, that the inventive concept is not limited to the following exemplary embodiments, and may be implemented in various forms. Accordingly, the exemplary embodiments are provided only to disclose examples of the inventive concept and to let those skilled in the art understand the nature of the inventive concept.

The terms used in the present specification are used to describe a particular embodiment and are not used to limit the present invention. As in the present specification, a singular form may include a plural form unless the singular form definitely indicated otherwise in the context. Also, in the present specification, the terms "include", "including", "comprise" and/or "comprising" specify existence of shapes, numbers, steps, operations, members, elements, and/or groups thereof, which are referred to, and do not exclude existence or addition of one or more different shapes, numbers, operations, members, elements, and/or groups thereof.

Figure 1:
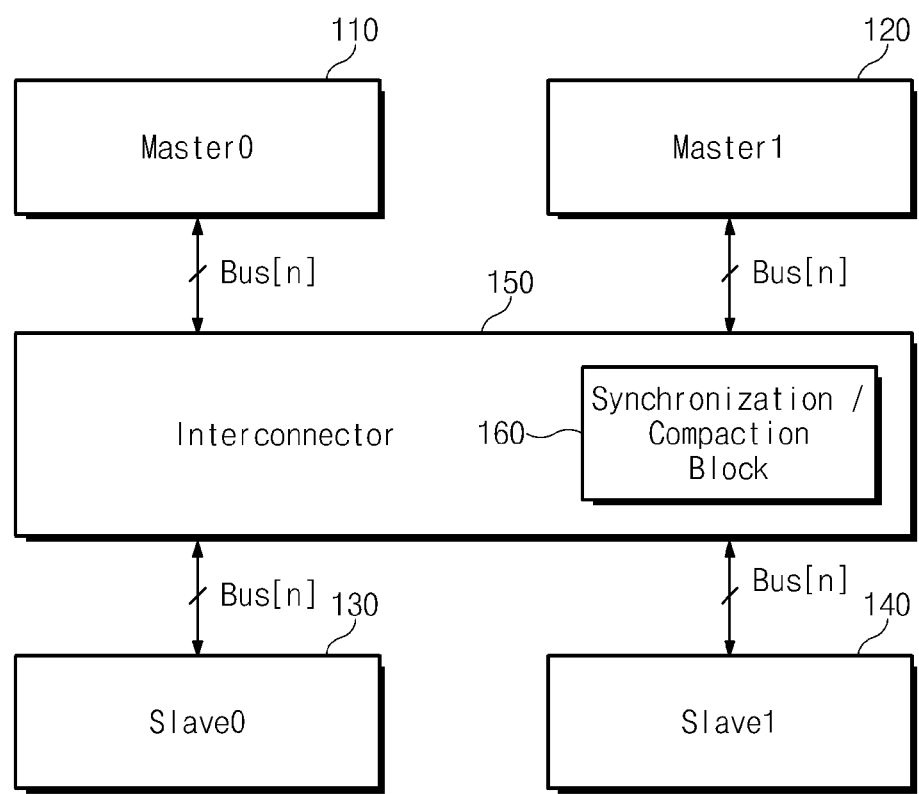
FIG. 1 is a block diagram of a bus system according to an exemplary embodiment.

FIG. 1 is a block diagram of a bus system according to an exemplary embodiment. As illustrated, the bus system includes two master devices 110 and 120, two slave devices 130 and 140, and an interconnector 150. The interconnector 150 includes a synchronization/compaction block 160. For brevity of explanation, it is assumed that a bus system according to an exemplary embodiment includes two master devices and two slave devices.

The maser devices 110 and 120 are configured to provide a command to operate a slave device (e.g., write and read operations). The master devices 110 and 120 may include, for example, a central processing unit (CPU), a microcontroller or a microprocessor (not shown). The slave devices 130 and 140 are configured to execute a command provided from a master device in response to the command. The slave devices 130 and 140 may include, for example, a volatile memory device, a nonvolatile memory device or a memory controller for controlling a memory device (not shown).

The interconnector 150 is coupled between the master devices 110 and 120 and the slave devise 13 and 140 The interconnector 150 controls traffic provided from the master devices 110 and 120 to the slave devices 130 and 140 or traffic provided from the slave devices 130 and 140 to the master devices 110 and 120. For example, the traffic control of the interconnector 150 may include arbitration in which a traffic transfer sequence is modified according to the priority of traffic, decoding in which a traffic transfer path is set, and buffering in which traffic transfer is buffered according to operation performance of the master devices 110 and 120 or the slave devices 130 and 140.

The synchronization/compaction block 160 controls traffic provided from the master devices 110 and 120 to the slave devices 130 and 140. In particular, synchronization/compaction block 160 controls traffic for write request (hereinafter referred to as "write request traffic") and traffic for write data (hereinafter referred to as "write data traffic") when the master devices 110 and 120 request a write operation to the slave devices 130 and 140. For example, the synchronization/compaction block 160 may synchronize a write request traffic with a write data traffic. In addition, the synchronization/compaction block 160 may control traffic transfer to prevent transfer delay from occurring when a write request traffic and a write data traffic are transferred and prevent transfer delay from occurring when a plurality of write data traffics are transferred.

Each of the master devices 110 and 120 is connected to the interconnector 150 through a plurality of buses Bus[n]. Each of the slave devices 130 and 140 is connected to the interconnector 150 through a plurality of buses Bus[n]. The master devices 110 and 120 provide traffic to the slave devices 130 and 140 through the plurality of buses Bus[n]. Similarly, the slave devices 130 and 140 provide traffic to the master devices 110 and 120 through the plurality of buses Bus[n].

In the bus system where the master devices 110 and 120 are connected to the slave devices 130 and 140 through a bus, traffic transfer is conducted according to a determined protocol of the bus system. According to one exemplary embodiment, a protocol of the bus system may include an AXI protocol of AMBA bus system. The above-mentioned AXI protocol will now be described below in detail with reference to FIGS. 2 and 3.

Figure 2:
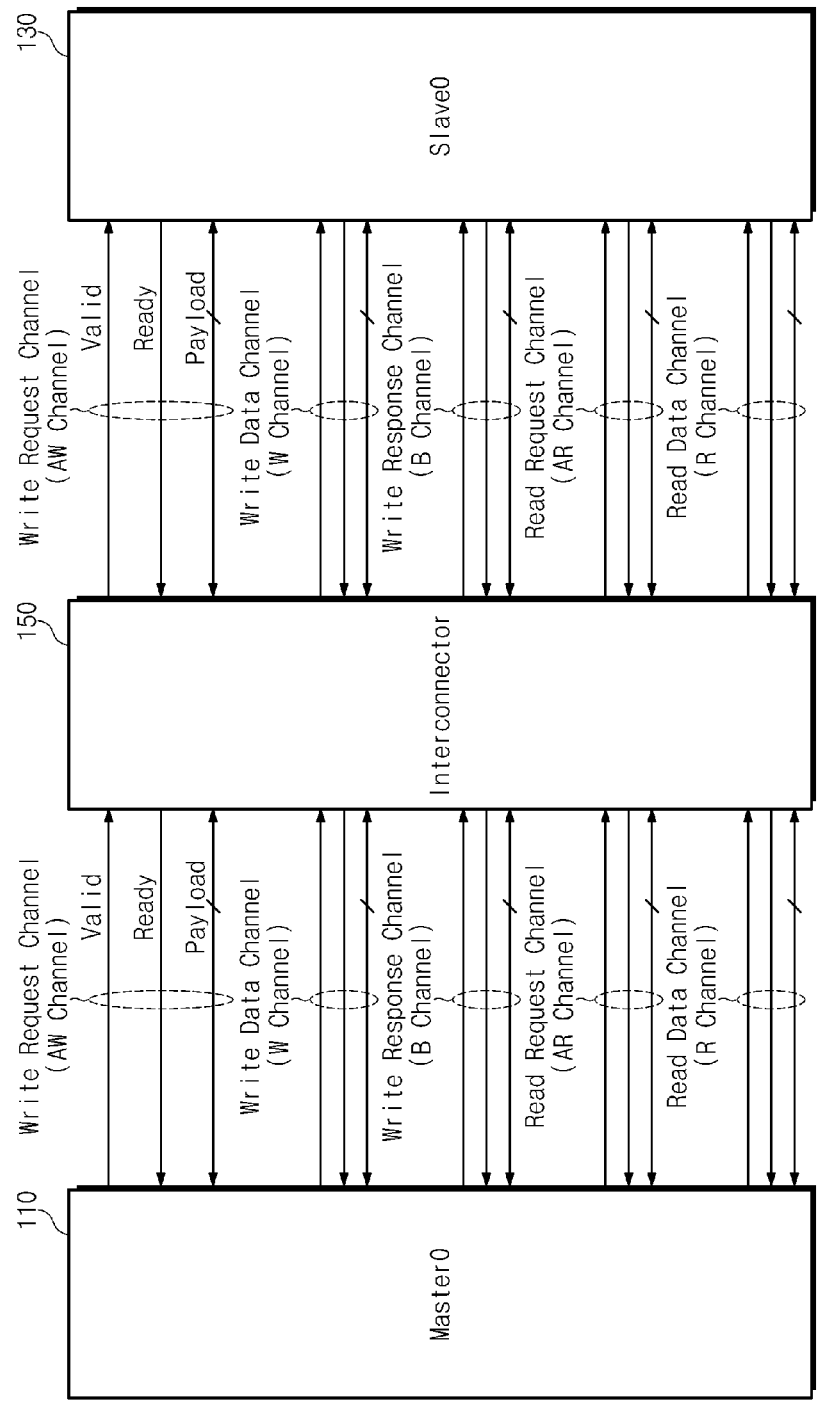
FIG. 2 is a block diagram of a channel configuration of an AXI protocol for a bus system according to an exemplary embodiment.

FIG. 2 is a block diagram of a channel configuration of an AXI protocol for a bus system according to an exemplary embodiment. For brevity of explanation, only a channel configuration between a master device 110 and a slave device 130 is shown in FIG. 2.

In an exemplary embodiment, a bus system may be an AMBA bus system developed by ARM Ltd. Traffic may be provided to a slave device from a master device according to an AXI protocol, among protocols of the AMBA bus system.

In the AXI protocol, a bus set classified according to the kind of traffic is defined as a channel. A channel may be physically divided according to the kind of traffic. For example, channels may include a write request channel, a write data channel, a write response channel, a read request channel, and a read data channel. In addition, channels may transmit a valid signal, a ready signal, and payload signals, respectively. The payload signal may include identifier (ID), address, data size or response signal.

In an exemplary embodiment, since a channel is physically divided according to the kind of traffics, a write request channel (AW channel), a write data channel (W channel), and a write response channel (B channel) may be separated from each other. While an AXI protocol of an AMBA bus system has been exemplarily described in the above exemplary embodiment, it will be understood that technical features of the inventive concept may be applied to a bus system in which a write control channel, a write data channel, and a write response channel are separated from each other.

Figure 3:
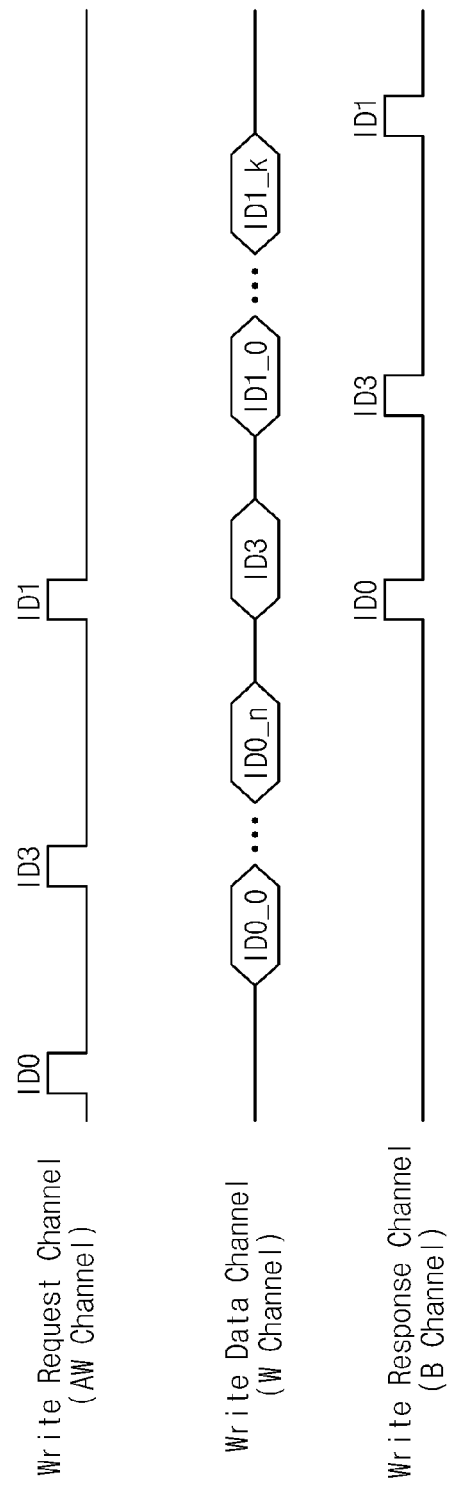
FIG. 3 is a timing diagram illustrating the traffic of a bus system according to an exemplary embodiment.

FIG. 3 is a timing diagram illustrating the traffic of a bus system according to an exemplary embodiment. FIG. 3 shows traffic provided to a slave device from a master device through a write request channel (AW channel), a write data channel (W channel), and a write response channel (B channel).

As set forth in FIG. 2, traffic provided through respective channels (a write request channel, a write data channel, and a write response channel) includes an identifier (ID; an identifier included in a payload signal). For example, after providing a write request traffic having an identifier 0 (ID0), the master device may provide a write data traffic having an identifier 0 (ID0) corresponding to the write request traffic. The slave device may provide a write response traffic having the identifier 0 (ID0) in response to the write request traffic having the identifier 0 (ID0). In addition, the master device may provide a write data traffic in the order of providing the write request traffic.

The master device may provide another write request traffic while providing the write data traffic corresponding to the previously provided write request traffic. That is, referring to FIG. 3, the master device may provide a write request traffic having an identifier 3 (ID3) while providing the write data traffic having the identifier 0 (ID0). Thus, a synchronization/compaction block (160 in FIG. 1) may synchronize transfer of the write request traffic and the write data traffic. In addition, the synchronization/compaction block 160 may control transfer time to prevent transfer delay from occurring when the write request traffic and the write data traffic are transferred and control transfer time to prevent transfer delay from occurring when a plurality of write data traffics are transferred.

Figure 4:
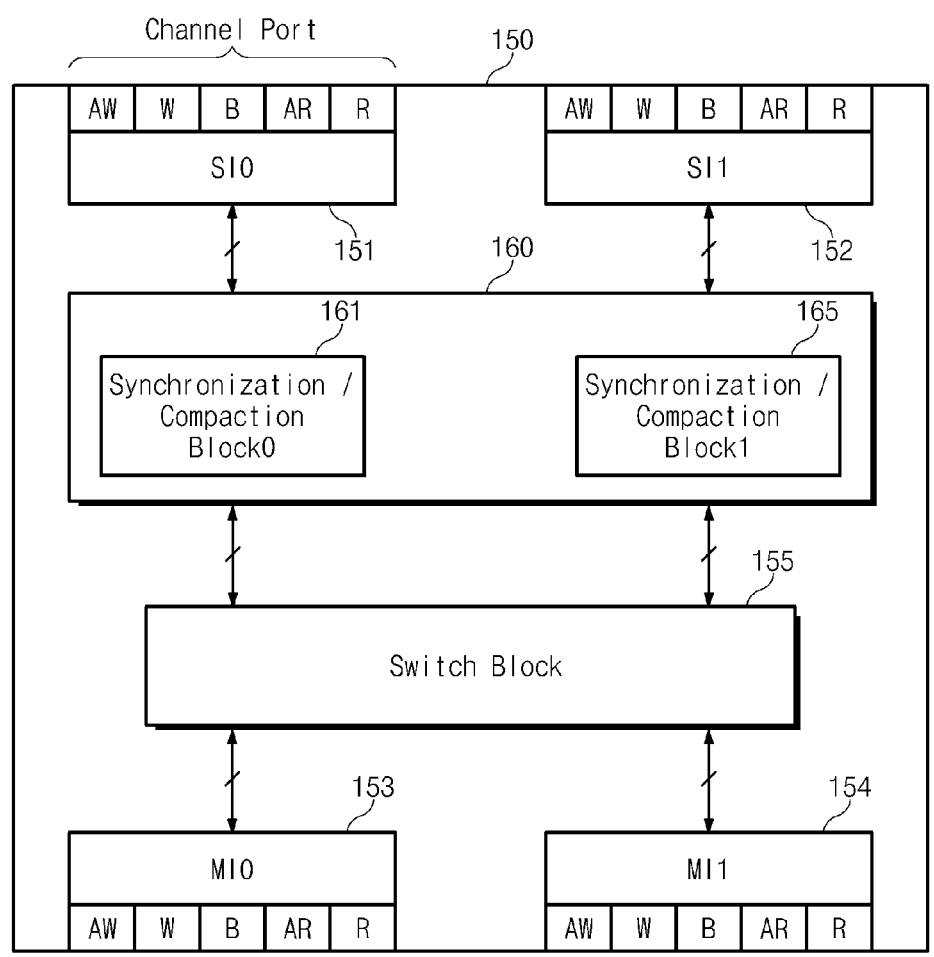
FIG. 4 is a block diagram of an interconnector shown in FIG. 1.

FIG. 4 is a block diagram of the interconnector 150 shown in FIG. 1. As illustrated, the interconnector 150 includes a slave interface 0 (SI0) 151, a slave interface 1 (SI1) 152, a master interface 0 (MI0) 153, a master interface 1 (MI1) 154, a switch block 155, and a synchronization/compaction block 160. The synchronization/compaction block 160 includes synchronization/compaction blocks 161 and 165 that are allocated to the slave interfaces 151 and 152, respectively.

In FIG. 1, for brevity of explanation, it is assumed that the bus system 100 includes two master devices and two slave devices. Therefore, in FIG. 4, it is assumed that there are two slave interfaces respectively connected to two master devices and two master interfaces respectively connected to two slave devices.

Referring to FIGS. 1 and 4, the interconnector 150 connects the master devices 110 and 120 to the slave devices 130 and 140. The slave interface0 (SI0) 151, the slave interface1 (SI1) 152, the master interface0 (MI0) 153, and the master interface1 (MI1) 154 are connected to the master device0 (Master0) 110, the master device1 (Master1) 120, the slave device0 (Slave0) 130, and the slave device1 (Slave1) 140, respectively. The slave interfaces 151 and 152 and the master interfaces 153 and 154 include channel ports AW, W, B, AR, and R connected to channels of the interfaces 151, 152, 153, and 154, respectively.

The slave interfaces 151 and 152 and the master interfaces 153 and 154 may perform an arbitration operation to change a traffic transfer order according to the priority of traffics and a buffering operation to buffer traffic transfer according to operation performance of the master devices 110 and 120 or the slave devices 130 and 140. The slave interfaces 151 and 152, the master interfaces 153 and 154, and the switch block 155 may perform an operation to switch a traffic transfer path by decoding the same.

The synchronization/compaction block 160 may include synchronization/compaction blocks that are connected to a plurality of slave interfaces, respectively. That is, the synchronization/compaction block 160 includes a synchronization/compaction block0 161 connected to the slave interface0 151 and a synchronization/compaction block1 165 connected to the slave interface1 152.

The synchronization/compaction blocks 161 and 165 control traffics provided to the slave devices 130 and 140 from the master devices 110 and 120. That is, the synchronization/compaction block0 161 controls traffic provided to the slave devices 130 and 140 from the master device0 110, and the synchronization/compaction block1 165 controls traffic provided to the slave devices 130 and 140 from the master device1 120.

For example, if the master device0 110 requests a write operation to the slave devices 130 and 140, the synchronization/compaction block0 161 may synchronize transfer of a write request traffic and a write data traffic. That is, if the write request traffic and the write data traffic are all provided from the master device0 110, the synchronization/compaction block0 161 may transfer the provided write request traffic and the provided write data traffic to the master interfaces 153 and 154, respectively.

In addition, if the master device0 110 requests a write operation to the slave devices 130 and 140, the synchronization/compaction block0 161 may control transfer time to prevent transfer delay from occurring when a write request traffic and a write data traffic are transferred and control transfer time to prevent transfer delay from occurring when a plurality of data traffics are transferred. For example, the synchronization/compaction block0 161 may control delay time to transfer the write data traffic to each of the master interfaces 153 and 154 immediately after transferring the write request traffic. Also the synchronization/compaction block0 161 may control transfer time to successively transfer a plurality of data traffics to the master interfaces 153 and 154 without delay time. That is, the synchronization/compaction block0 161 may control transfer time to buffer the write request traffic and the write data traffic and transfer the buffer traffics without delay time.

The synchronization/compaction block1 165 may perform the same operation as the synchronization/compaction block0 161. That is, if the master device1 120 requests a write operation to the slave devices 130 and 140, the synchronization/compaction block1 165 may synchronize transfer of a write request traffic and a write data traffic. In addition, if the master device1 120 request a write operation to the slave devices 130 and 140, the synchronization/compaction block1 165 may control transfer time to prevent transfer delay from occurring when a write request traffic and a write data traffic are transferred and control transfer time to prevent transfer delay from occurring when a plurality of write data traffics are transferred.

The synchronization/compaction blocks 161 and 165 may bypass the traffics provided to the slave devices 130 and 140 from the master devices 110 and 120 without controlling the provided traffics. That is, the synchronization/compaction blocks 161 and 165 may immediately transfer the traffics provided from the master devices 110 and 120 without synchronizing or buffering the provided traffics. The synchronization/compaction blocks 161 and 165 may perform the bypass operation when the master devices 110 and 120 do not provide traffics in a burst mode.

On the other hand, the synchronization/compaction blocks 161 and 165 may synchronize or buffer traffics when the master devices 110 and 120 provide traffics in the burst mode. For this operation, the synchronization/compaction blocks 161 and 165 may include a control unit for controlling traffic and buffers. The configurations of the synchronization/compaction blocks 161 and 165 will now be described below in detail with reference to FIG. 5.

Figure 5:
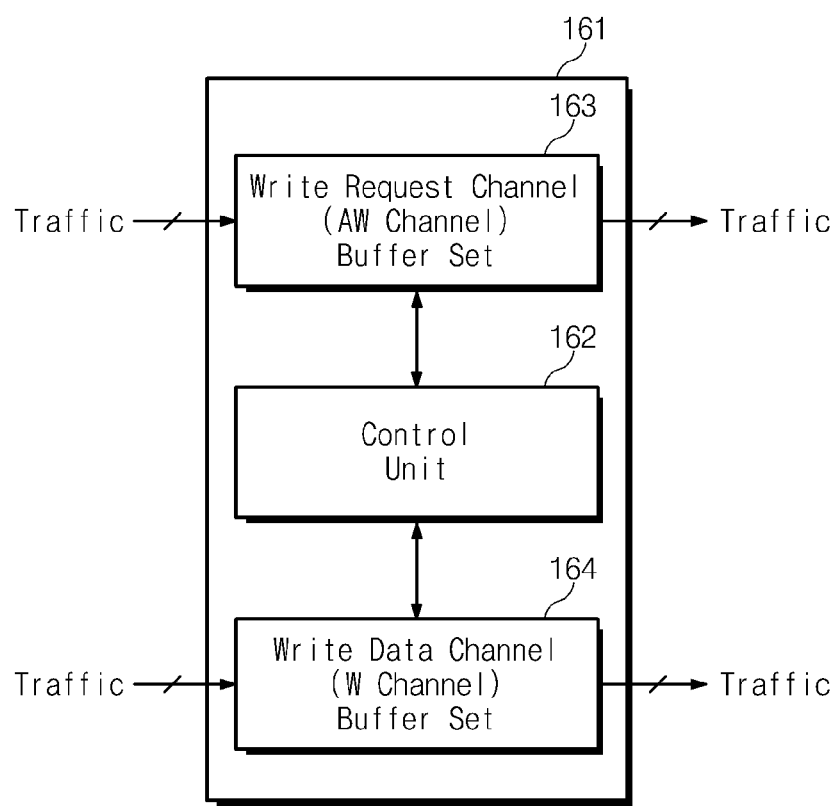
FIG. 5 is a block diagram of a synchronization block shown in FIG. 4.

FIG. 5 is a block diagram of a synchronization block shown in FIG. 4. The configurations of the synchronization blocks 161 and 165 may be identical to each other. Therefore, for brevity of explanation, only the configuration of the synchronization/compaction block 161 in FIG. 4 is illustrated in FIG. 4. Referring to FIG. 5, the synchronization/compaction block 161 includes a control unit 162, a write request channel (AW channel) buffer set 163, and a write data channel buffer (W channel) buffer set 164.

The write request channel buffer set 163 temporarily stores a write request traffic provided from a master device0 110. The write data channel buffer set 164 temporarily stores a write data traffic provided from the master device0 110. Buffer sizes of the write request channel buffer set 163 and the write data channel buffer set 164 may vary according to a burst mode of the master device0 110. For example, if a burst length that is a burst mode operation parameter of the master device0 110 is set to be large, buffer sizes of the write request channel buffer set 163 and the write data channel buffer set 164 may increase.

In order to synchronize transfer of the write request traffic and the write data traffic, the control unit 162 determines whether both the write request traffic provided to the synchronization/compaction block 161 and a corresponding write data traffic are all provided. The control unit 162 controls the write request channel buffer set 163 and the write data channel buffer set 164 such that two traffics are transferred to master interfaces (153 and 154 in FIG. 4) only when it is determined that the write request traffic and the corresponding write data traffic are all provided. That is, the control unit 162 synchronizes the transfer of the write request traffic and the write data traffic.

On the other hand, when it is determined that only the write request traffic is provided and the corresponding write data traffic is not provided, the control unit 162 controls the write request channel buffer set 163 such that the write request traffic is not transferred until the corresponding write data traffic is transferred.

In order to successively transfer the write request traffic and the write data traffic without delay time, the control unit 162 determines a point of time when the write request traffic provided to the synchronization/compaction block 161 is transferred. The control unit 162 may compare first estimated necessary time with second estimated necessary time to determine a point of time when the write request traffic is transferred. The first estimated necessary time implies estimated necessary time (e.g., cycle number) until a write data traffic that is not provided yet is provided from the master device0 110, and the second estimated necessary time implies estimated necessary time required for transferring a write data traffic to be transferred.

When it is determined that the first estimated necessary time is equal to or shorter than the second estimated necessary time, the control unit 162 controls the request channel buffer set 163 such that the write request traffic is transferred to the master interfaces 153 and 154. Immediately after the write request traffic is transferred, the control unit 162 controls the write data channel buffer set 164 such that the provided write data traffics are successively transferred.

On the other hand, when it is determined that the first estimated necessary time is longer than the second estimated necessary time, the control unit 162 controls the write request channel buffer set 163 and the write data channel buffer set 164 such that the write request traffic and the corresponding write data traffic are not transferred.

Figure 6:
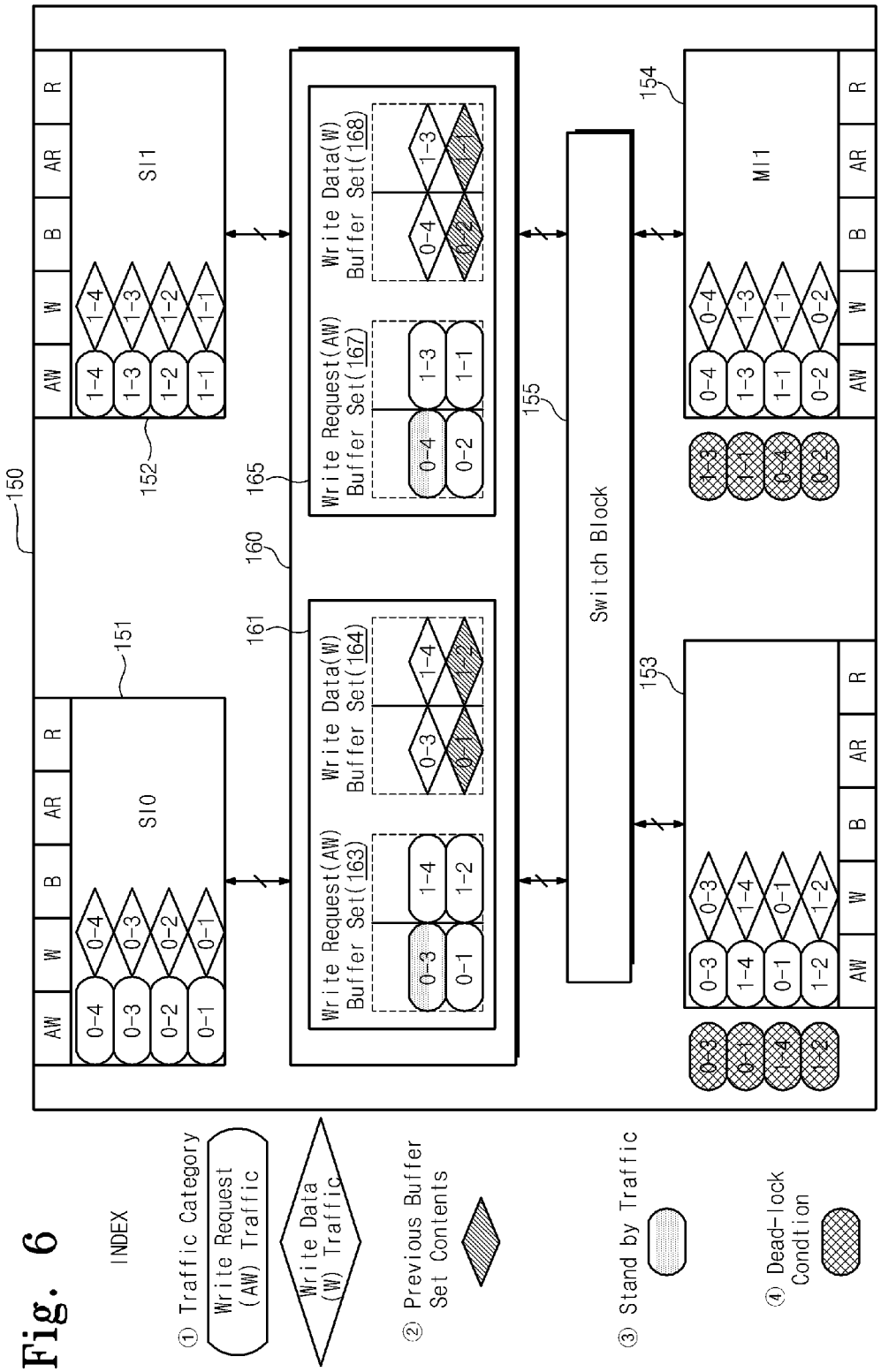
FIG. 6 is a conceptual diagram illustrating traffic of a bus system including an interconnector according to an exemplary embodiment.

FIG. 6 is a conceptual diagram illustrating traffic of a bus system including an interconnector according to an exemplary embodiment. FIG. 6 shows traffic where a master device0 (110 in FIG. 1) provides a write request traffic and a write data traffic to slave devices (130 and 140 in FIG. 1) through an interconnector 150 including a synchronization/compaction block 160, respectively. In addition, FIG. 6 shows traffic where a master device1 (120 in FIG. 1) provides a write request traffic and a write data traffic to the slave devices 130 and 140 through the interconnector 150 including the synchronization/compaction block 160, respectively.

The synchronization/compaction block 160 includes a synchronization/compaction block0 161 for controlling traffic provided to the slave device0 130 by the master devices 110 and 120 and a synchronization/compaction block1 165 for controlling traffic provided to the slave device 140 by the master devices 110 and 120.

When a write request traffic and a write data traffic are all provided from the slave interfaces 151 and 152, the synchronization/compaction blocks 161 and 165 transfer the provided write request traffic and the provided write data traffic to the master interfaces 153 and 154, respectively. For this operation, the synchronization/compaction block0 161 may include a write request channel buffer set 163 and a write data channel buffer set 164 that are allocated to the master interfaces 153 and 154, respectively. In addition, the synchronization/compaction block 165 may include a write request channel buffer set 167 and a write data channel buffer set 168 that are allocated to the master interfaces 153 and 154, respectively.

In an exemplary embodiment, it is assumed that the write request channel buffer sets 163 and 167 respectively allocated to the mater interfaces 153 and 154 are configured with two stages, and the write data channel buffers 164 and 168 respectively allocated to the master interfaces 153 and 154 are configured with one stage. In addition, each of the write request channel buffer sets 163 and 167 and each of the write data channel buffer sets 164 and 168 may have length that is equivalent to a value obtained by multiplying data width by burst length.

The master device0 110 provides, to the slave interface0 151, write request traffics (oval-shaped 0-1, 0-2, 0-3, and 0-4) to be provided to the slave devices 130 and 140 and corresponding write data traffics (diamond-shaped 0-1, 0-2, 0-3, and 0-4). The master device1 120 provides, to the slave interface1 152, write request traffics (oval-shaped 1-1, 1-2, 1-3, and 1-4) to be provided to the slave devices 130 and 140 and corresponding write data traffics (diamond-shaped 1-1, 1-2, 1-3, and 1-4).

The slave interfaces 151 and 152 may perform an arbitration operation and a buffering operation for the write request traffics and the write data traffics provided from the master devices 110 and 120, respectively. In an exemplary embodiment, the slave interfaces 151 and 153 may provide write request traffics and corresponding write data traffics to the synchronization/compaction block 160 in an order (e.g., order ascending from lower-number traffics).

As described in FIG. 3, the master devices 110 and 120 may provide a write request traffic through the slave interfaces 151 and 152 in advance of a write data traffic. Thus, the write request traffics provided from the master devices 110 and 120 may be stored in the write request channel buffer sets 163 and 167 of the synchronization/compaction blocks 161 and 165.

If the synchronization/compaction blocks 161 and 165 provides the provided write request traffic first without synchronizing the write request traffic with the corresponding write data traffic, the master interfaces 153 and 154 may enter a dead-lock state (see dead-lock condition), as illustrated. For example, the master interfaces 153 and 154 perform an arbitration operation for transferred write request traffics to determine the transfer priority of write data traffics. Accordingly, the master interfaces 153 and 154 stand by write data traffics (write data traffic 1-4 and write data traffic 0-4) which are not stored yet in the write data channel buffer sets 164 and 168. This dead-lock state occurs when sizes of the write data channel buffer sets 164 and 168 are not larger (for example, write request channel buffer sets are configured with two stages and write data channel buffer sets are configured with one stage) due to limited resources.

According to an exemplary embodiment, the synchronization/compaction block0 161 may transfer a write request traffic transferred to the master interface0 153 and a corresponding write data traffic after synchronizing the traffics with each other. The synchronization/compaction block1 165 may transfer a write request traffic transferred to the master interface1 154 and a corresponding write data traffic after synchronizing the traffics with each other.

The synchronization/compaction block0 161 performs a synchronization operation to transfer a write request traffic and a write data traffic when the two traffics are provided and stored in the write request channel buffer set 163 and the write data channel buffer set 164. Thus, the synchronization/compaction block0 161 may directly transfer a write request transfer 0-1 and a corresponding write data traffic 0-1 provided from the slave interface0 151 as well as a write request traffic 1-2 and a corresponding write data traffic 1-2 provided from the slave interface1 152 without transfer waiting.

At this point, the synchronization/compaction block0 161 may transfer the traffics (the write request traffic and the corresponding write data traffic) to the master interface0 153 according to the order of providing write request traffics. In FIG. 6, it is illustrated that the write request traffic 1-2 and the corresponding write data traffic 1-2 provided from the slave interface1 152 are transferred first. If the write request traffic 0-1 and the write request traffic 1-1 are simultaneously provided from the slave interfaces 151 and 152, the synchronization/compaction block0 161 may determine the transfer order according to an arbitration scheme of the master interface0 153 to transfer a write request traffic and a corresponding write data traffic.

The synchronization/compaction block1 165 performs a synchronization operation to transfer a write request traffic and a write data traffic when the two traffics are provided and stored in the write request channel buffer set 167 and the write data channel buffer set 168. Thus, the synchronization/compaction block1 165 may directly transfer a write request traffic 0-2 and a corresponding write data traffic 0-2 provided from the slave interface0 151 as well as a write request traffic 1-1 and a corresponding write data traffic 1-1 provided from the slave interface1 152 without transfer waiting.

At this point, the synchronization/compaction block1 165 may transfer the traffics (the write request traffic and the corresponding write data traffic) to the master interface1 154 according to the order of providing write request traffics. In FIG. 6, it is illustrated that the write request traffic 0-2 and the corresponding write data traffic 0-2 provided from the slave interface0 151 are transferred first. If the write request traffic 0-2 and the write request traffic 1-2 are simultaneously provided from the slave interfaces 151 and 152, the synchronization/compaction block1 165 may determine the transfer order according to an arbitration scheme of the master interface1 154 to transfer a write request traffic and a corresponding write data traffic.

Since the write data channel buffer set 168 configured with one stage is idle, the synchronization/compaction block1 165 may store a write data traffic 1-3 provided from the slave interface1 152 in the write data channel buffer set 168. Thereafter, the synchronization/compaction block11 165 may transfer the provided write request traffic 1-3 and a write data traffic 1-3. Since a write request traffic 0-4 is provided from the slave interface0 151 but a corresponding write data traffic 0-4 is not provided, the synchronization/compaction block1 165 may wait for transfer of a write request traffic 0-4 without transferring the request write request traffic 0-4.

Similarly, since the write data channel buffer set 164 configured with one stage is idle, the synchronization/compaction block0 161 may store a write data traffic 1-4 provided from the slave interface1 152 in the write data channel buffer set 164. The write data traffic 1-4 may be provided to the slave interface1 152 after the write data traffic1-3 is provided to the synchronization/compaction block1 165. The synchronization/compaction block0 161 may transfer the provided write request traffic 1-4 and a write data traffic 1-4.

The synchronization/compaction block0 161 may store a write data traffic 0-3 provided from the slave interface0 151 in the write data channel buffer set 164. Thereafter, the synchronization/compaction block0 161 may transfer the write request traffic 0-3 and a write data traffic 0-3 which waited for transfer. Similarly, the synchronization/compaction block1 165 may store the write data traffic 0-4, which is provided after the write data traffic 0-3 is provided to the synchronization/compaction block0 165, in the write data channel buffer set 168. Thereafter, the synchronization/compaction block0 161 may transfer the write request traffic 0-4 and the write data traffic 0-4 which waited for transfer.

Figure 7:
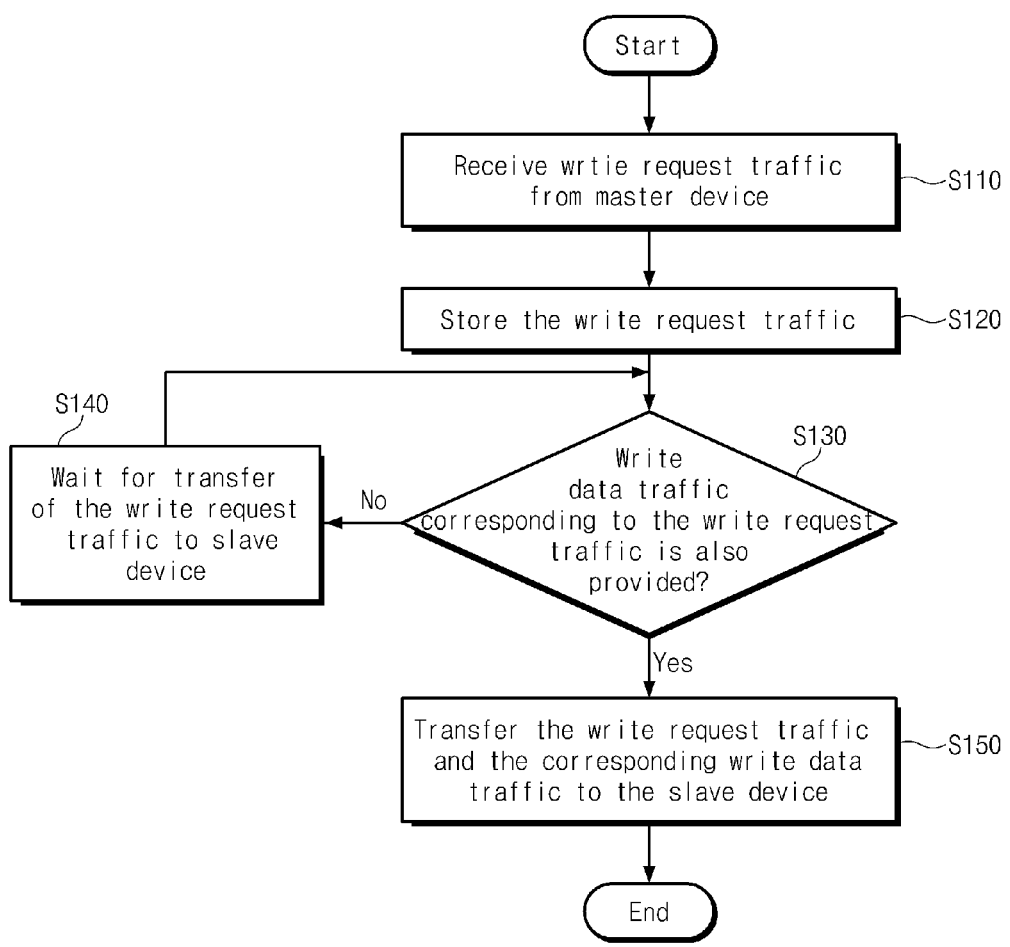
FIG. 7 is a flowchart illustrating the operation of a synchronization/compaction block according to an exemplary embodiment.

FIG. 7 is a flowchart illustrating the operation of a synchronization/compaction block according to an exemplary embodiment. The operation of the synchronization/compaction block according to an exemplary embodiment will now be described with reference to FIGS. 4 and 7.

A synchronization/compaction block 160 receives a write request traffic from a master device (S110). The write request traffic may be provided to the synchronization/compaction block 160 through slave interfaces 151 and 152 of an interconnector 150. The synchronization/compaction block 160 temporarily stores the provided write request traffic in a write request channel buffer set (S120). The synchronization/compaction block 160 determines whether the provided write request traffic and a corresponding write data traffic are all provided (S130).

If it is determined that only the write request traffic is provided but the corresponding write data traffic is not provided (S130—No), the synchronization/compaction block 160 waits to transfer the provided write request traffic to a slave device (S140). The transfer waiting of the synchronization/compaction block 160 may be maintained until the write data traffic corresponding to the provided write request traffic is provided.

On the other hand, if it is determined that the write request traffic and the corresponding write data traffic are all provided (S130—Yes), the synchronization/compaction block 160 transfer the provided write request traffic and the provided corresponding write request traffic to the slave device (S150). The two traffics (the write request traffic and the write data traffic) provided from the synchronization/compaction block 160 are transferred to the slave device through mater interfaces 153 and 154 of the interconnector 150.

According to an exemplary embodiment, when the write request traffic and the corresponding write data traffic are all provided from the master device, the synchronization/compaction block 160 may transfer the two traffics to the slave device. The synchronization operation of the synchronization/compaction block 160 may reduce the size of a buffer memory included in the interconnector 150 and prevent a dead-lock state of the interconnector 150.

Figure 8:
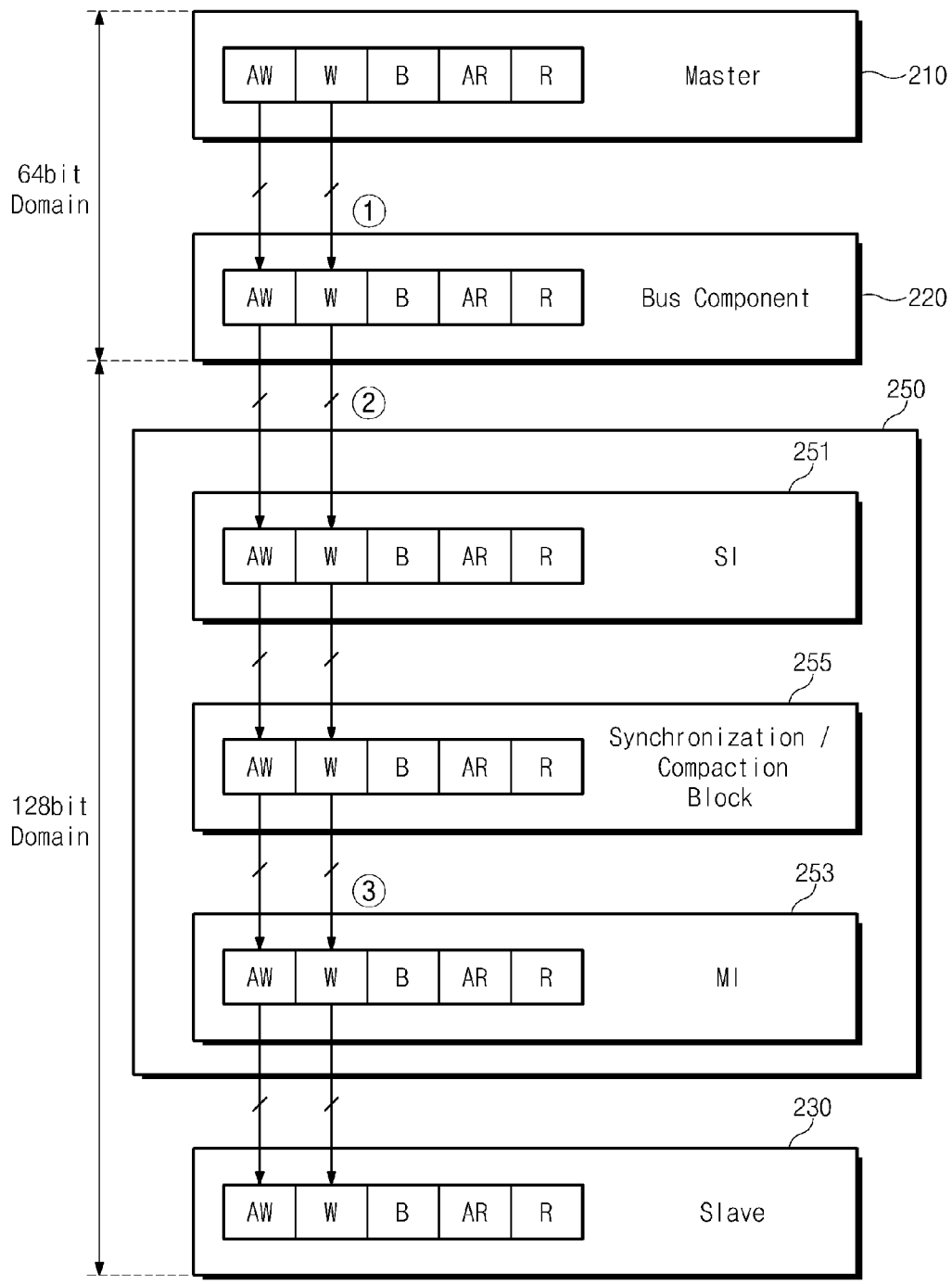
FIGS. 8 and 9 are conceptual diagrams illustrating the traffic of a bus system according to another exemplary embodiment.
Figure 9:
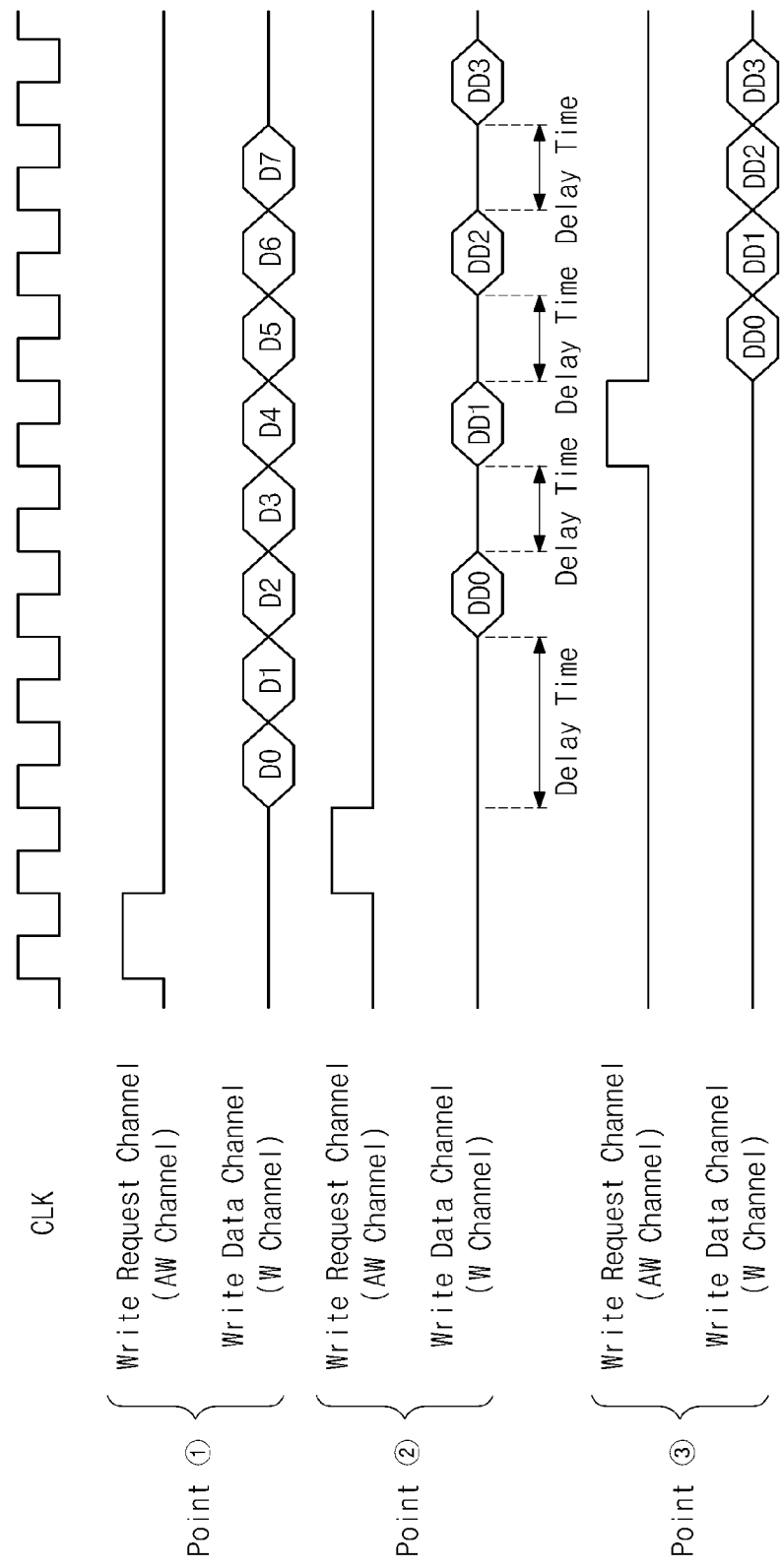

FIGS. 8 and 9 are conceptual diagrams illustrating the traffic of a bus system according to another exemplary embodiment. Referring to FIG. 8, a bus system 200 according to another exemplary embodiment includes a master device 210, a bus component 220, a slave device 230, and an interconnector 250. For brevity of explanation, it is assumed that a bus system according to another exemplary embodiment includes one master device and one slave device.

The bus component 220 is coupled between the master device 210 and the interconnector 250. The bus component 220 may include an upsizer for expanding width of a bus system or an asynchronous bridge for increasing clock speed of the bus system. It is assumed that the bus component of the bus system 200 includes an upsizer.

The interconnector 250 includes a slave interface 251, a master interface 253, and a synchronization/compaction block 255. The slave interface 251 and the master interface 253 may have the same configurations and perform the same operations as the slave interface (151 or 152 described in FIG. 4) and the master interface (153 or 154 described in FIG. 4), respectively. Therefore, the slave interface 251 and the master interface 253 will be not explained in further detail for brevity of explanation.

The synchronization/compaction block 255 according to another exemplary embodiment has the same configuration as the synchronization/compaction block (161 described in FIG. 5). That is, the synchronization/compaction block 255 includes a control unit (see 162 in FIG. 5), a write request channel buffer set (see 163 in FIG. 5), and a write data channel buffer set (see 164 in FIG. 5). The synchronization/compaction block 255 may control traffic transfer to prevent transfer delay from occurring when a write request traffic and a write data traffic are transferred. In addition, the synchronization/compaction block 255 may control traffic transfer to prevent transfer delay from occurring when a plurality of write data traffics are transferred.

Referring to FIG. 8, the master device 210 provides 64 bits of traffic while the interconnector 250 and the slave device 230 provide 128 bits of traffic. Accordingly, the upsizer 220 may be coupled between the master device 210 and the interconnector 250 to change a traffic size. In this configuration, a traffic flow is shown in FIG. 9.

Referring to FIG. 9, the master device 210 may provide 64 bits of a write request traffic and a corresponding write data traffic (see traffic flow of point ①). On the other hand, the upsizer 220 changes the 64 bits of traffic provided from the master device 210 to 128 bits of traffic and transfers the 128 bits of traffic to the slave interface 251. Thus, the upsizer 220 may provide write data traffics having delay time to the slave interface 251 (see traffic flow of point ②). Unless the synchronization/compaction block 255 controls traffic such that delay time does not occur, speed of a bus system may become low due to the delay time.

The synchronization/compaction block 255 according to another exemplary embodiment may control transfer time to transfer a write data traffic to the master interface 253 immediately after a write request traffic is transferred. The synchronization/compaction block 255 control delay time to successively transfer a plurality of write data traffics to the master interface 253 without delay time.

For example, the synchronization/compaction block 255 may temporarily store a write request traffic provided from the slave interface 251 in a write request channel buffer set and temporarily store a write data traffic in a write data channel buffer set. The synchronization/compaction block 255 may control traffics buffered to the write request channel buffer set and the write data channel buffer set to be transferred without delay time.

The synchronization/compaction block 255 may compare a first estimated necessary time with a second estimated necessary time and determine a time point of transferring buffered traffics (the write request traffic and the write data traffic) according to a result of the comparison. The first estimated necessary time is time required until providing a write data traffic not yet provided from the slave interface 251, and the second estimated necessary time is time required for transferring a write data traffic to be transferred to the master interface 253. These estimated necessary times may be determined with reference to information on size of write data included in the write request traffic.

As an example, when it is determined that the first estimated necessary time is shorter than or equal to the second estimated necessary time, the synchronization/compaction block 255 may transfer the buffered traffics. On the other hand, when it is determined that the second estimated necessary time is longer than the second estimated necessary time, the synchronization/compaction block 255 may not transfer the buffered traffics.

Figure 10:
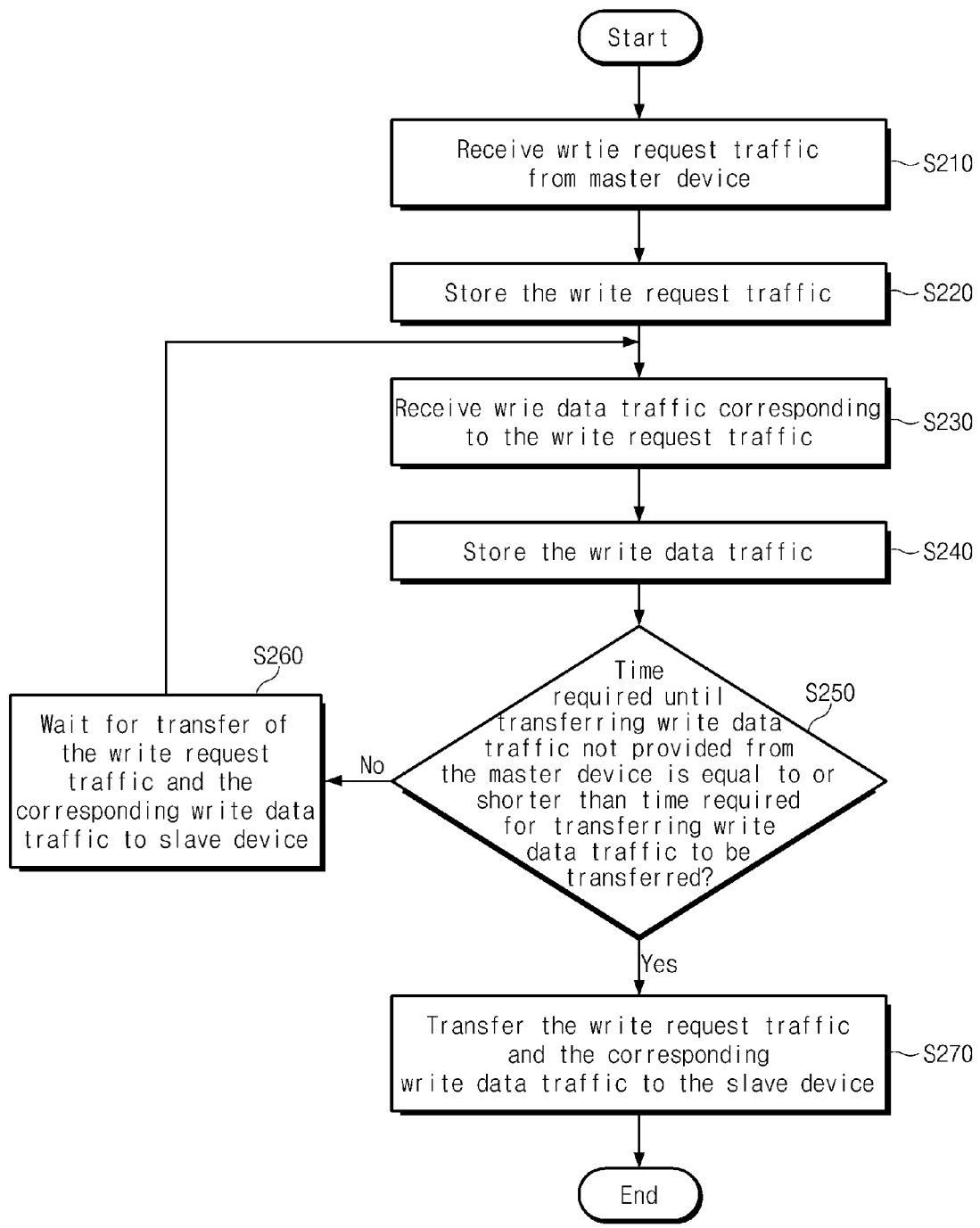
FIG. 10 is a flowchart illustrating the operation of a synchronization/compaction block according to another exemplary embodiment.

FIG. 10 is a flowchart illustrating the operation of a synchronization/compaction block according to another exemplary embodiment. The operation of the synchronization/compaction block will now be described below in detail with reference to FIGS. 8 and 10.

A synchronization/compaction block 255 receives a write request traffic from a master device 255 (S210). The write request traffic may be provided to the synchronization/compaction block 255 through a bus component 220 such as an upsizer or an asynchronous bridge and a slave interface 251 of an interconnector 250. The synchronization/compaction block 255 temporarily stores the provided write request traffic in a write request channel buffer set disposed therein (S220).

The synchronization/compaction block 255 receives a write data traffic corresponding to the write request traffic provided from the master device (S230). The provided write data traffic may be provided to the synchronization/compaction block 255 through the bus component 220 such as an upsizer or an asynchronous bridge and the slave interface 251 of the interconnector 250. The synchronization/compaction block 255 temporarily stores the provided write data traffic in a write data channel buffer set disposed therein (S240).

The synchronization/compaction block 255 may compare first estimated necessary time with second estimated necessary time to determine a time point of transferring traffics buffered to a write request channel buffer set and a write data channel buffer set (S250). The first estimated necessary time is time required until providing a write data traffic not yet provided from the master device, and the second estimated necessary time is time required for transferring a write data traffic to be transferred to a slave device.

The operation sequence of the synchronization/compaction block 255 may branch according to a result of the determination. When it is determined that the first estimated necessary time is longer than the second estimated necessary time (No), the synchronization/compaction block 255 waits without transferring the provided write request traffic and the provided write data traffic to the slave device (S260). In this case, the synchronization/compaction block 255 may continue to receive a write data traffic from the master device.

On the other hand, when it is determined that the first estimated necessary time is shorter than or equal to the second estimated necessary time (Yes), the synchronization/compaction block 255 transfers the provided write request traffic and the provided write data traffic to the slave device (S270). The two traffics provided from the synchronization/compaction block 255 may be transferred to the slave device through the master interface 253 of the interconnector 250.

According to another exemplary embodiment, the synchronization/compaction block 255 may control a write request traffic and a write data traffic to transfer the traffics without delay time. Due to the simplification operation of the synchronization/compaction block 255, a bus occupancy may be minimized to enhance operating speed of the bus system.

According to the embodiments of the inventive concept described above, a bus system is capable of preventing deadlock and efficiently using system resources.

While exemplary embodiments have been particularly shown and described, it will be apparent to those of ordinary skill in the art that various changes in form and detail may be made therein without departing from the spirit and scope of the inventive concept as defined by the following claims.

What is claimed is:

1. A bus system comprising:
a first master device;
a second master device;
at least one slave device; and
an interconnector coupled to the first master device, the second master device, and the at least one slave device, the interconnector including:
a first control unit configured to control transfer of a first write request and one or more first write data corresponding to the first write request, the first write request and the one or more first write data being coupled with the first master device, the one or more first write data including a first subset and a second subset, the first subset of the one or more first write data being not yet transferred from the first master device to the interconnector, the second subset of the one or more first write data being already transferred from the first master device to the interconnector;
a second control unit configured to transfer of a second write request and one or more second write data corresponding to the second write request, the second write request and the one or more second write data being coupled with the second master device, the one or more second write data including a first subset and a second subset, the first subset of the one or more second write data being not yet transferred from the second master device to the interconnector, the second subset of the one or more second write data being already transferred from the second master device to the interconnector; and
a buffer configured to store the second subset of the one or more first write data and the second subset of the one or more second write data,
wherein the first control unit is configured to estimate a first time required to transfer the first subset of the one or more first write data from the first master device to the interconnector,
wherein the first control unit is configured to estimate a second time required to transfer the second subset of the one or more first write data from the interconnector to the at least one slave device,
wherein the first control unit is configured to determine whether the second time is equal to or longer than the first time,
wherein the second control unit is configured to estimate a third time required to transfer the first subset of the one or more second write data from the second master device to the interconnector,
wherein the second control unit is configured to estimate a fourth time required to transfer the second subset of the one or more second write data from the interconnector to the at least one slave device,
wherein the second control unit is configured to determine whether the fourth time is equal to or longer than the third time,
wherein the interconnector is configured to determine whether the second subset of the one or more first write data is to be transferred to the at least one slave device based on the determination whether the second time is equal to or longer than the first time,
wherein the interconnector is configured to determine whether the second subset of the one or more second write data is to be transferred to the at least one slave device based on the determination whether the fourth time is equal to or longer than the third time, and
wherein, if both the second subset of the one or more first write data and the second subset of the one or more second write data are determined to be transferred, the interconnector is configured to transfer to the at least one slave device either the second subset of the one or more first write data or the second subset of the one or more second write data, based on a priority of the first write request and the second write request.

2. The bus system of claim 1, wherein, if the second subset of the one or more first write data is determined to be transferred and the second subset of the one or more second write data is determined not to be transferred, the interconnector is configured to transfer the second subset of the one or more first write data to the at least one slave device.

3. The bus system of claim 1, wherein, if the second subset of the one or more first write data is determined not to be transferred and the second subset of the one or more second write data is determined to be transferred, the interconnector is configured to transfer the second subset of the one or more second write data to the at least one slave device.

4. The bus system of claim 1, wherein, if the second subset of the one or more first write data is determined not to be transferred and the second subset of the one or more second write data is determined not to be transferred, neither the second subset of the one or more first write data nor the second subset of the one or more second write data is transferred to the at least one slave device.

5. A bus system comprising:
a first master device;
a second master device;
at least one slave device; and
an interconnector coupled to the first master device, the second master device, and the at least one slave device, the interconnector including:
a control unit configured to control transfer of a first write request and one or more first write data corresponding to the first write request, and transfer of a second write request and one or more second write data corresponding to the second write request, the first write request and the one or more first write data being coupled with the first master device, the second write request and the one or more second write data being coupled with the second master device, the one or more first write data including a first subset and a second subset, the first subset of the one or more first write data being not yet transferred from the first master device to the interconnector, the second subset of the one or more first write data being already transferred from the first master device to the interconnector, the one or more second write data including a first subset and a second subset, the first subset of the one or more second write data being not yet transferred from the second master device to the interconnector, the second subset of the one or more second write data being already transferred from the second master device to the interconnector; and
one or more buffer configured to store the second subset of the one or more first write data and the second subset of the one or more second write data,
wherein the control unit is configured to estimate a first time required to transfer the first subset of the one or more first write data from the first master device to the interconnector,
wherein the control unit is configured to estimate a second time required to transfer the second subset of the one or more first write data from the interconnector to the at least one slave device,
wherein the control unit is configured to estimate a third time required to transfer the first subset of the one or more second write data from the second master device to the interconnector,
wherein the control unit is configured to estimate a fourth time required to transfer the second subset of the one or more second write data from the interconnector to the at least one slave device, and
wherein, based on the first time, the second time, the third time and the fourth time, the control unit is configured to determine whether the second subset of the one or more first write data is to be transferred to the at least one slave device and whether the second subset of the one or more second write data is to be transferred to the at least one slave device.

6. The bus system of claim 5, wherein the second subset of the one or more first write data is transferred to the at least one slave device if the second time is equal to or longer than the first time and the fourth time is shorter than the third time.

7. The bus system of claim 5, wherein the second subset of the one or more second write data is transferred to the at least one slave device if the second time is shorter than the first time and the fourth time is equal to or longer than the third time.

8. The bus system of claim 5, wherein if the second time is shorter than the first time and the fourth time is shorter than the third time, neither the second subset of the one or more first write data nor the second subset of the one or more second write data is transferred to the at least one slave device.

9. The bus system of claim 5, wherein, if the second time is equal to or longer than the first time and the fourth time is equal to or longer than the third time, either the second subset of the one or more first write data or the second subset of the one or more second write data is transferred to the at least one slave device.

10. The bus system of claim 5, wherein the interconnector includes a first synchronization/compaction block configured to synchronize the first write request with the one or more first write data, and a second synchronization/compaction block configured to synchronize the second write request with the one or more second write data.

11. The bus system of claim 5, wherein the first write request is transferred to the interconnector earlier than the second write request, and the one or more first write data is transferred to the at least one slave device earlier than the one or more second write data.

12. The bus system of claim 5, wherein the first write request is transferred to the interconnector earlier than the second write request, and the one or more first write data is transferred to the at least one slave device later than the one or more second write data.

13. The bus system of claim 5, further comprising one or more request buffer configured to store the first write request transferred from the first master device to the interconnector and the second write request transferred from the second master device to the interconnector.

14. The bus system of claim 6, wherein the first write request is transferred to the at least one slave device before the second subset of the one or more first write data is transferred to the at least one slave device if the second time is equal to or longer than the first time and the fourth time is shorter than the third time.

15. The bus system of claim 7, wherein the second write request is transferred to the at least one slave device before the second subset of the one or more second write data is transferred to the at least one slave device if the second time is shorter than the first time and the fourth time is equal to or longer than the third time.

16. The bus system of claim 9, wherein if the second time is equal to or longer than the first time and the fourth time is equal to or longer than the third time, either the second subset of the one or more first write data or the second subset of the one or more second write data is transferred to the at least one slave device, based on a priority of the first write request and the second write request.

17. A bus system comprising:
a master device;
a slave device; and
an interconnector coupled to the master device and the slave device, the interconnector including a control unit configured to control transfer of a write request and one or more write data corresponding to the write request,
wherein the control unit is configured to estimate a first time required to transfer from the master device to the interconnector a first subset of the one or more write data, the first subset of the one or more write data being not yet transferred from the master device to the interconnector, wherein the control unit is configured to estimate a second time required to transfer from the interconnector to the slave device a second subset of the one or more write data, the second subset of the one or more write data being already transferred from the master device to the interconnector, and wherein, based on the first time and the second time, the control unit is configured to determine whether the second subset of the one or more write data is to be transferred from the interconnector to the slave device.

18. The bus system of claim 17, wherein the slave device is a memory device.

19. The bus system of claim 17, further comprising an upsizer coupled to the master device and to the interconnector, the upsizer being configured to expand data width of the bus system.

20. The bus system of claim 17, further comprising a bridge coupled to the master device and to the interconnector, the bridge being configured to increase speed of a clock of the bus system.

* * * * *